Figure 1:
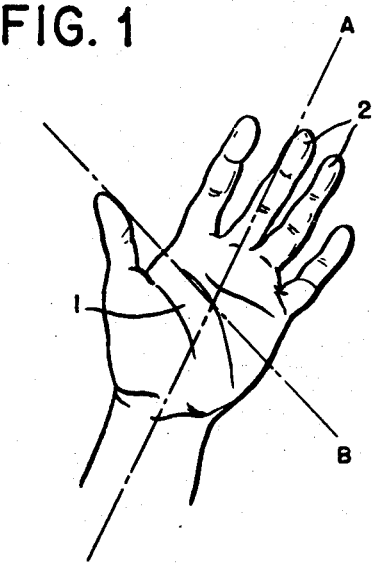

April 30, 1968  E. MATICHARD  3,380,157
ELECTRIC RAZOR WITH APPROXIMATELY CYLINDRICAL
HANDLE AND CYLINDRICAL CUTTING
SURFACE AT AN ANGLE THERETO Filed May 28, 1965  5 Sheets-Sheet 1

INVENTOR
Eugene Matichard
BY
ATTORNEYS

FIG. 3
FIG. 4
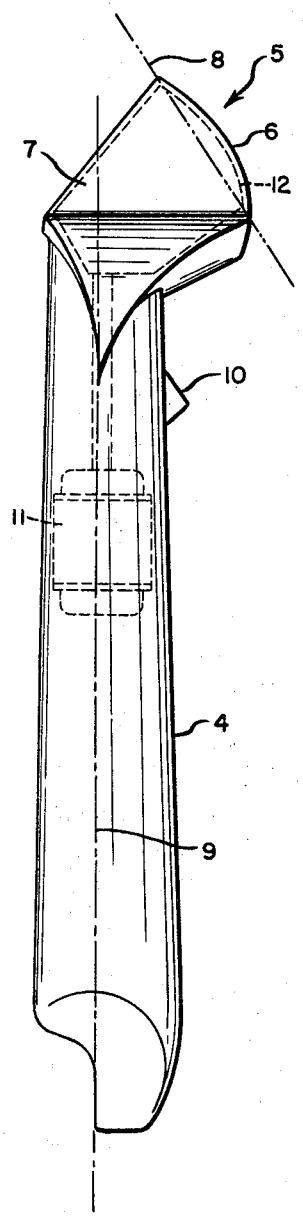
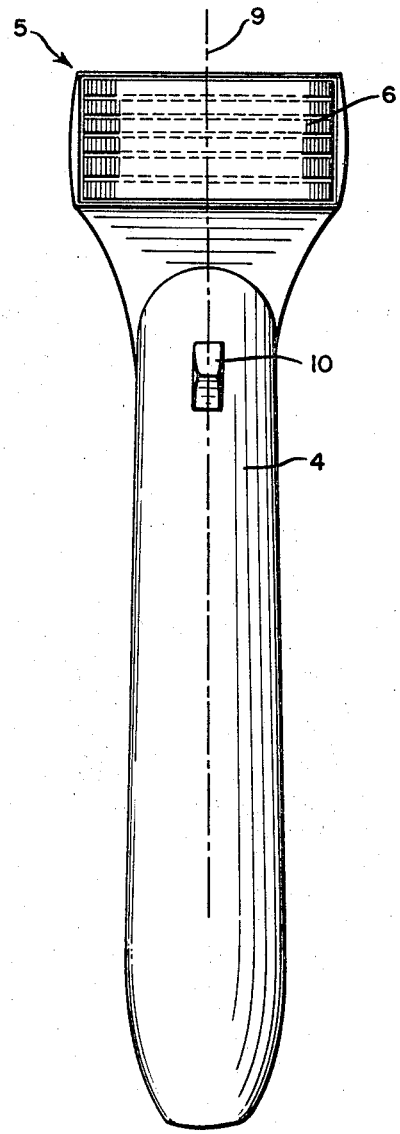
INVENTOR
Eugene Matichard
BY
ATTORNEYS

April 30, 1968  E. MATICHARD  3,380,157
ELECTRIC RAZOR WITH APPROXIMATELY CYLINDRICAL
HANDLE AND CYLINDRICAL CUTTING
SURFACE AT AN ANGLE THERETO
Filed May 28, 1965  5 Sheets-Sheet 3
FIG. 5
FIG. 6
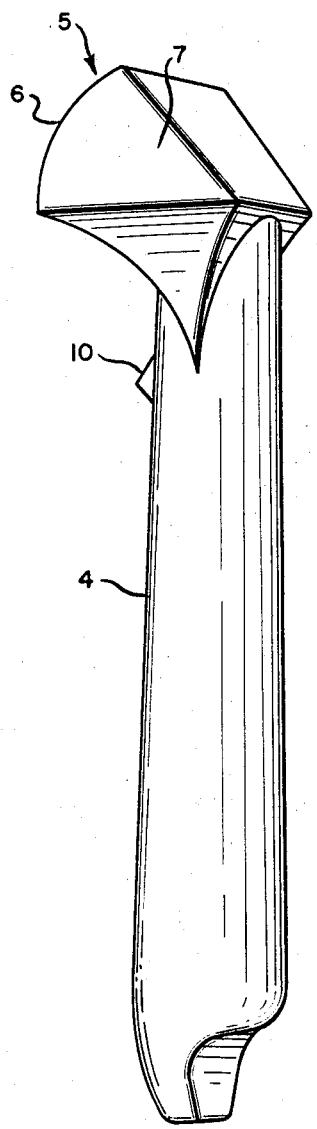
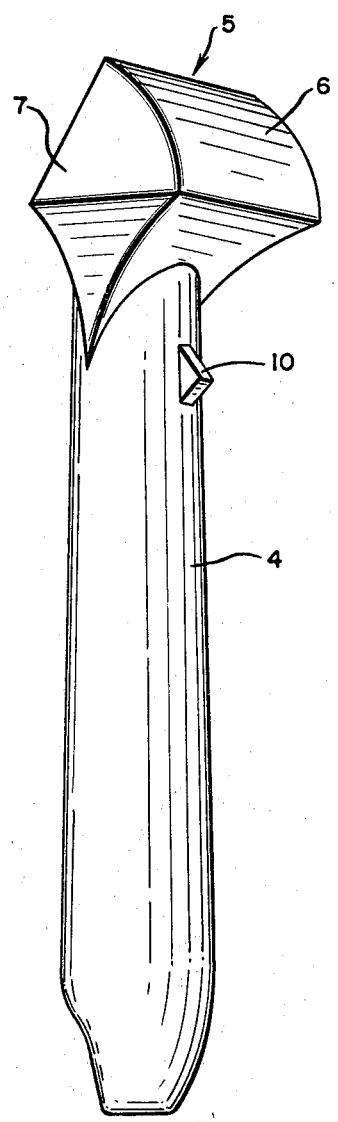
INVENTOR
Eugene Matichard
BY
ATTORNEYS April 30, 1968   E. MATICHARD   3,380,157
ELECTRIC RAZOR WITH APPROXIMATELY CYLINDRICAL
HANDLE AND CYLINDRICAL CUTTING
SURFACE AT AN ANGLE THERETO
Filed May 28, 1965   5 Sheets-Sheet 5

INVENTOR
Eugene Matichard
BY
ATTORNEYS

United States Patent Office 3,380,157
Patented Apr. 30, 1968

3,380,157
ELECTRIC RAZOR WITH APPROXIMATELY CYLINDRICAL HANDLE AND CYLINDRICAL CUTTING SURFACE AT AN ANGLE THERETO
Eugene Matichard, Ambilly Haute-Savoie, France, assignor to Etablissement Aesup, Vaduz, Liechtenstein, a firm of Liechtenstein
Filed May 28, 1965, Ser. No. 475,030
Claims priority, application Switzerland, May 29, 1964, 7,044/64
3 Claims. (Cl. 30—43.92)

One already knows many electric razors the shape of which tends to meet the physiological and morphological requirements of simple, efficient and quick shaving. However, none of them meet the requested standards in a satisfactory manner.

In fact, the act of shaving which results from the contact of a cutting surface with the skin to be shaved, depend not only on the quality of the grid and of the knife with regard to the pressure exerted on the skin, but also on the direction of the cutting surface with respect to the skin surface, of the dimensions of said cutting surface, of the movement imparted to the razor by the user's hand and of the very manner the razor is gripped which must not be tiring for the hand and the arm, as otherwise it could be detrimental to the shaving.

In most forms of embodiment already known, the dimensions of the razor's body do not allow it to be gripped by the hand in a natural manner. The muscles and joints of the fingers, of the wrist, of the forearm and even of the user's shoulder and, important static and dynamic stresses which result in a useless strain which is detrimental to the quality of the shaving.

The way such razor must be gripped demands inordinate flexion and torsion movements of the wrists and of the forearm for treating those parts of the skin to be shaved which are most difficult to reach.

The cutting head, which carries the cutting surface for shaving the skin, has been given until now such an orientation and such dimensions that, on the one hand, the skin to be shaved cannot be easily treated over all its surface according to its morphology and that, on the other hand, the pressure with which the razor grid is applied against the skin is uneven in view of the underlying bends and of the variable hardness of the areas shaven. This results in an imperfect cut of the hair and in a local irritation of the skin.

In view of the above, the advanced studies both in the physiological and morphological fields and in the technical field, have led to define the shape of a new electric razor comprising an elongated body, in which is housed a motor, and a cutting head mounted at one extremity of said body, such a new razor meeting the above-mentioned drawbacks.

This new razor is characterised in that the body thereof is constituted by a housing, the geometry of which is such that it can be encircled by the user's hand, by the fact that the cutting head has a convex cutting surface the secant plane of which makes with the body axis an angle of from 20° to 35°, and in that said cutting head gradually extends beyond the extension of the body, all such features permitting to grip the razor and to run its head, with a natural movement of the hand and of the arm, over the skin to be shaved.

Figure 2:
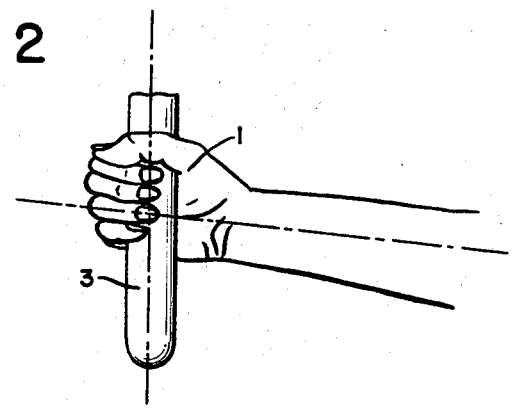
Figure 7:
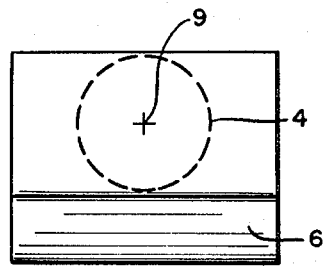
Figure 8:
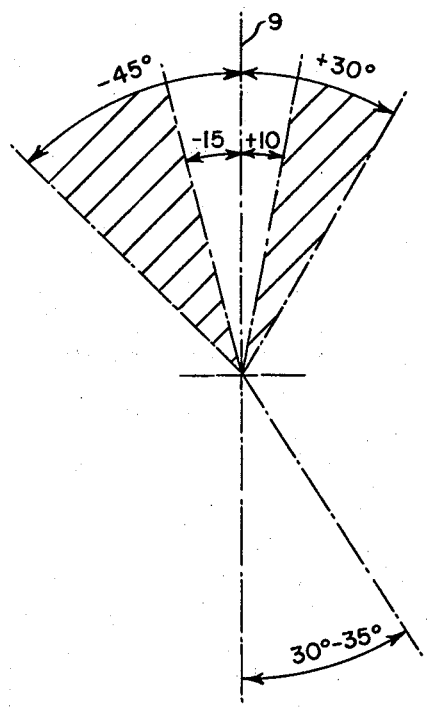
Figure 9:
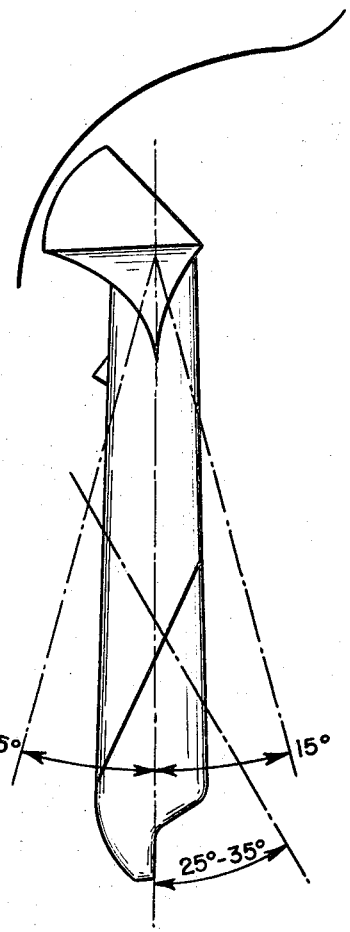
Figure 10:
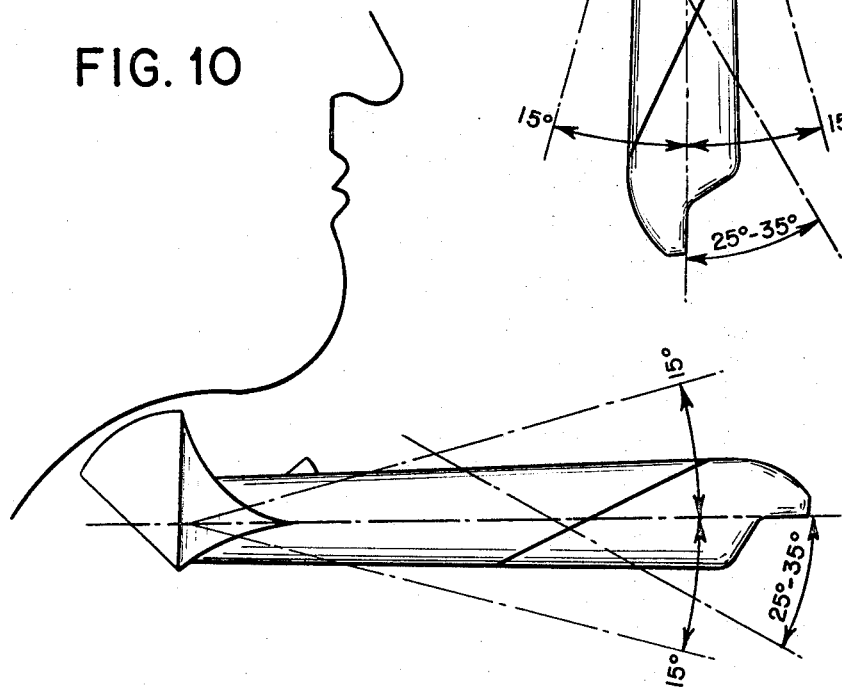

The features of the present invention will be disclosed hereafter, reference being had to the accompanying drawing in which:

FIG. 1 is a plan view of the palm of a hand.
FIG. 2 is an elevational view of a hand holding an object.
FIG. 3 is a profile view of the form of embodiment disclosed.
FIG. 4 is an elevational view.
FIG. 5 is a profile view, a quarter from the back.
FIG. 6 is a profile view, a quarter from the front.
FIG. 7 is a plan view.
FIG. 8 is a diagram showing the angles of use of the razor and of normal swing of the wrist.
FIG. 9 is an elevation view of a first possible manner of using the razor and
FIG. 10 is an elevational view of a second possible manner.

In the following description, one will first consider the morphology of the skin to be shaved, from which result the shape and dimensions to be given to the cutting surface of the razor. One will then consider the physiological behaviour of the hand and of the arm which determines the gripping of a razor. Finally, by grouping the above conditions, one will describe the functional shape to be given to the new razor according to the invention.

The part of the pilary system usually shaved by men are to be found on the face, the chin, the neck, the armpit and the legs. However, the parts of the skin which are most usually treated are the face, the chin and the neck, where the hairs to be shaved are the side-whiskers, the hairs of the cheek-bone and of the chin, the moustache and the hairs of the neck and of the Adam's apple. The morphology of these areas is extremely variable. It can be analysed with regard to the juxtaposition in or of slightly convex unit areas, and with regard to the resonance of such areas to the pressure exerted.

In a general manner, the plane or slightly convex areas can be easily shaved. On the other hand, when the concavity of the portion to be shaved is well marked, for instance under the zydomatic arch, between the lower lip and the chin, or near the Adam's apple, the access to the hairs is more difficult, and it is more complicated to shave them, since they are orientated at random. Another problem is that of the underlying muscles. The malar bone, the lower jaw bone and the cartilaginous ring of the trachea, and also the larynx bones said hard areas whereas the thickness of the skin is small, whereas outside such areas, the skin is endowed with a greater elasticity and greater strain under pressure. It results from these remarks that the cutting surface of the razor must be small, in order that it can exactly follow the surface of the skin to be shaved, that it can reach small areas and also in order to limit the detrimental effect on the quality of the shaving of the resistance under pressure of the skin covering underlying bones.

The razor used is intended to be held by the hand and palm, by means of a movement of the wrist and of the forearm, over the skin to be shaved. Until now it was frequently necessary to resort to other muscles than those of the forearm and the wrist, for instance those of the arm, of the shoulder and of the neck, to achieve the shaving operation. Of course such movements are tedious for the user and they divert his attention. It is considered that, on the one hand, the static stress must be avoided and, on the other hand, it is requested for obtaining a good efficiency to conform the tool to the natural movements of the body.

Let us examine a hand: by a reflex dating from the earliest days of life, the hands tend to close upon an object to be gripped. In FIG. 1, line A, designates the normal axis of the wrist and forearm. Axis B is that of the direction of grip. The fingers 2 of hand 1 naturally close around the axis B to grip an object and encircle it. If this object complies with this requirement, the gripping action is easy and is best as regards the assets required. The best shape to be given to the object to be gripped is therefore that of a cylindrical handle. FIG. 2 shows hand 1 holding the handle 3.

When the user's arm is vertical, along the body, and the forearm is about horizontal as shown in FIG. 2 the wrist naturally constitutes an extension of this forearm and the hand grips the handle in the vertical position. Physiologically, the smallest possible asset consists in raising or lowering the forearm vertically, without moving the arm itself, so that the handle follows the substantially vertical path, parallel to the axis of the neck and of the head of the user.

In cases such as with currently marketed electric razors this is not possible. The hand cannot grasp the tool and surround it by its fingers. As a consequence, the tool is placed against the palm, the hand and the fingers surround it only partially. In order to make vertical movements on the face it is not enough for the wrist to effect movements, otherwise the cutting surface will be in the air. A muscular interplay between the hand, the wrist, the forearm and the shoulder comes in and as a result, muscular fatigue sets in.

The latter remarks lead to the following requirements as regards the razor: the razor body must have a shape akin to that of a cylindrical handle and its diameter must be small enough for allowing the fingers to encircle it.

It naturally follows that the cutting surface must be located at the other end of the razor body. As already pointed out, said surface is very small. On the other hand, in view of the natural upward and downward movement of the forearm, this cutting surface must be orientated with respect to the skin to be shaved.

As shown in FIGS. 3–7, at the upper end of body 4 is mounted a cutting head 5, with a cutting surface 6, mounted in an extension 7 of the body in the shape of a cylindrical sector. The cutting surface 6 is convex and its secant plane 8, defined as being the plane cutting through its extreme parallel edges, makes an acute angle with the axis 9 of body 4.

The cutting surface has a radius of 32.5 mm. which has been chosen as being best fitted for the shaving of the concave areas situated under the chin. That value of the radius does not hinder the shaving of the convex areas of the cheeks and other portions of the skin, since, in view of the elasticity of the skin, the shaving occurs on the sole surface. A greater radius would have only very slightly improved the shaving of plane or convex areas, and on the other hand it would have considerably hindered the shaving of concave areas. A smaller radius would have only very slightly facilitated the shaving of the latter and, on the other hand, it would have rendered quite unpleasant the shaving of plane or convex areas since, with the same force applied, the resulting pressure of the cutting head on the skin would have been higher. It follows that the penetration of the hairs into the holes of the grid forming the cutting surface would have been deeper, and the chaffing of the skin would have been increased by large amounts.

The width and height to be given to the cutting surface results from the consideration of the morphology of the skin to be shaved. It has been found that a width of from 4.5 to 5 cm. and a height of from 3 to 3.5 cm. viz an area of about 15 sq. cm., was best suited for an optimum shaving. With such an area of the cutting surface, one succeeds in limiting the pressure on the skin to values of from 15 to 25 gm. per sq. cm., values which have proved to be the best for avoiding chaffing.

As regards the slant to be given to the cutting surface with respect to the general axis line of the razor, it has been determined with respect to the natural position of the user's wrist during the shaving operation. The secant plane 8 makes an angle of 33° with respect to the axis line of the body 4 or, which amounts to the same, a median plane passing through the cutting surface and at right angles to said secant plane, makes an angle of 57° with respect to said axis 9. Such a value allows the user to shave without necessitating oscillations of his wrist of more than 25° (+10° in one direction and −15° in the other direction). In fact, between +10° and +30°, the position taken by the wrist becomes quickly tiring, and the same is true between −15° and −45° (see FIG. 8).

The area of the right cross section of the razor body is about 5 sq. cm and it corresponds therefore to a perfect grip of the razor. A driving motor 11 is located in the housing formed by the body 4 and it drives a knife 12 mounted on the cutting head against the grid forming the cutting surface 6. The starting and stopping of this motor can be controlled by a knob 10 such as shown in FIG. 3, with no effort whatever, by means of the thumb of the hand which holds the body.

The operation of the above-described razor is very simple. For all the surfaces to be shaved corresponding nearly to these cylinders the axis of which is coincident with that of the user's body, and upward and downward movement of the razor, in the natural position of a hand with only a slight flexion of the wrist, is quite sufficient. The user's face can pivot about the body axis, without strain, to turn the successive surfaces to be shaved towards the razor and the mirror. In FIG. 9, one can see for instance the shaving operation of the neck. For the part of the skin under the chin, it is simply needed to cause the razor to pivot in the hand and to bend the wrist sideways, for obtaining an efficient shaving (FIG. 10). As regards the moustache, the dimensions of the cutting area permit to shave without any risk of cutting the lip. This is also true for the whiskers and the beard. In fact, the plane surfaces limiting the razor cutting surface constitute abutments which prevent the cutting portions of the cutting surface to contact the sensitive portions of the face and of the other parts of the body.

Generally speaking, a very slight pressure of the razor on the skin is sufficient, and it can be easily operated without strain, by means of the lever arm formed by the oblong razor held in the hand.

It is to be noted that the above-described razor is perfectly suited for shaving the armpits, in view of its small cutting surface. In addition, it is to be noted that other portions of the body, for instance the legs, can also be very easily treated.

I claim:

1. An electric razor comprising an approximately cylindrical body forming a handle, a cutting head comprising a grid and movable inner cutting means cooperating therewith, said cutting head being mounted at one end of said handle and projecting forwardly and upwardly therefrom, and a driving motor within said body for driving said movable cutting means, said handle having a cross-sectional area of about 5 sq. cm. and a length greater than the breadth of the user's hand, said cutting head having an area cutting surface in the shape of a convex substantially cylindrical sector with the axis thereof at right angles to the axis of said handle, said area cutting surface having an arcuate dimension of at least about 3 cm. and extending in the axial direction thereof beyond said handle on each side thereof, said area cutting surface being substantially offset from the axis of the handle in the cutting direction thereof and the secant plane of the cutting surface intersecting the axis of the handle beyond the cutting head and making a substantial included acute angle therewith within the range of approximately 20 to 35 degrees.

2. An electric razor in accordance with claim 1 in which the axial length of said cutting surface is in the range of approximately 4.5 to 5 cm.

3. An electric razor in accordance with claim 1 in which the upper and lower surfaces of the cutting head are non-cutting and extend back from the respective upper and lower edges of said cutting surface at the interior angles not exceeding substantially 90° to said secant plane.

References Cited
UNITED STATES PATENTS

| | | | |
|---|---|---|---|
| 2,082,987 | 6/1937 | Steinhilper | 30—43.6 |
| 2,808,645 | 10/1957 | Tournier | 30—43.6 |
| 2,823,453 | 2/1958 | Lattin | 30—43.8 |

FOREIGN PATENTS

| | | |
|---|---|---|
| 1,271,023 | 7/1961 | France. |
| 603,285 | 6/1948 | Great Britain. |

MYRON C. KRUSE, *Primary Examiner.*

WILLIAM FELDMAN, *Examiner.*